(12) United States Patent
Yoshimoto

(10) Patent No.: US 6,637,771 B2
(45) Date of Patent: Oct. 28, 2003

(54) ELECTRIC TILT ADJUSTABLE STEERING APPARATUS FOR A VEHICLE

(75) Inventor: Shin Yoshimoto, Gunma-ken (JP)

(73) Assignee: NSK Ltd., Tokyo (JP)

( * ) Notice: Subject to any disclaimer, the term of this patent is extended or adjusted under 35 U.S.C. 154(b) by 40 days.

(21) Appl. No.: 10/014,498

(22) Filed: Dec. 14, 2001

(65) Prior Publication Data
US 2002/0079685 A1 Jun. 27, 2002

(30) Foreign Application Priority Data
Dec. 26, 2000 (JP) .................................. 2000-395353

(51) Int. Cl.$^7$ ................................................ B62D 1/189
(52) U.S. Cl. ................................. 280/775; 74/493
(58) Field of Search ................... 280/775, 779; 74/492, 493

(56) References Cited

FOREIGN PATENT DOCUMENTS

| JP | 5-79546 | 11/1993 |
|---|---|---|
| JP | 9-11913 | 1/1997 |
| JP | 2002-2503 | 1/2002 |

*Primary Examiner*—Eric Culbreth
(74) *Attorney, Agent, or Firm*—Miles & Stockbridge P.C.

(57) ABSTRACT

An electric tilt adjustable steering apparatus for a vehicle for automatically tilt adjusting a steering column by an electric motor so as to regulate an angle of inclination of the steering column to a desired one, includes a tilt adjusting mechanism provided on one side of the steering column for converting a rotational driving force of the electric motor into a rectilinear motion so as to tilt-adjust the steering column, and a slide portion provided on the other side of the steering column to be brought into slidable contact with the stationary side by convex-concave fitting in a substantially triangular form, so as to slide the steering column upon tilt adjusting.

1 Claim, 3 Drawing Sheets

ELECTRIC TILT ADJUSTABLE STEERING APPARATUS FOR A VEHICLE

BACKGROUND OF THE INVENTION

1. Field of the Invention

The present invention relates to an electric tilt adjustable steering apparatus for a vehicle with improved rigidity of a steering column in the vertical and horizontal directions.

2. Related Background Art

In an electric tilt adjustable steering apparatus for a vehicle, as shown in the prior Japanese Patent Application No. 2000-193227 owned by the assignee, or shown in FIGS. 3A and 3B, for instance, a tilt adjusting mechanism b is formed on one side of a steering column a for converting the rotational driving force of an electric motor to a rectilinear motion, thereby automatically adjusting the tilt of the steering column a. On the other side of the steering column a, a slide portion c is formed for sliding the steering column a in the vertical direction upon adjusting the tilt.

This slide portion c is arranged such that the left side of the steering column a is formed to be flat, and a plate d is attached to this flat surface. A flat block f is provided between this plate d and a flat internal wall of a housing e. Between the plate d and the block f, a roller h supported by a cage g is interposed.

With the above arrangement, when the steering column a is tilt-adjusted, the plate d slides on the flat surface of the block f through the rollers h, so that the steering column a can smoothly slide in the vertical direction.

It should be noted that a clamping bolt i is attached on the left wall of the housing e by means of a lock nut j and the clamping bolt i is clamped with a predetermined torque, so that a preload is applied in the right direction onto the block f. With this arrangement, backlash in the vertical direction and horizontal direction of the steering column a can be prevented.

However, since the electric tilt adjustable steering apparatus described above is arranged such that the plate d of the steering column a slides the block f through the rollers h, when a load is applied on the steering wheel in the vertical and horizontal directions, backlash of the steering column a in the vertical and horizontal directions can not always be prevented satisfactorily; hence the steering column a has low rigidity in the vertical and horizontal directions.

SUMMARY OF THE INVENTION

The present invention has been contrived taking the circumstances as mentioned above into consideration, and an object of the invention is to provide an electric tilt adjustable steering apparatus for a vehicle with the improved rigidity of the steering column in the vertical and horizontal directions.

In order to achieve the above object, according to the present invention, there is provided an electric tilt adjustable steering apparatus for a vehicle for automatically adjusting the tilt of a steering column by means of an electric motor so as to regulate an angle of inclination of the steering column to a desired one, comprising:

a tilt adjusting mechanism provided on one side of the steering column for converting a rotational driving force of the electric motor into a rectilinear motion so as to adjust the tilt of the steering column; and a slide portion provided on the other side of the steering column which is in slidable contact with the stationary side by convex-concave fitting substantially in a triangular form, so as to slide the steering column upon tilt adjusting.

As described above, according to the present invention, since the slide portion is brought into contact with the stationary side by convex-concave fitting substantially in a triangular form, it is possible to smoothly slide the steering column in the vertical direction by sliding the slide portion on the convex-concave fitted portion substantially in a triangular form upon tilt adjusting.

Moreover, since the slide portion is brought into slidable contact by convex-concave fitting substantially in a triangular form, even when a load is applied on the steering wheel in the vertical direction and the horizontal direction, the backlash of the steering column in the vertical direction and the horizontal direction can be satisfactorily prevented, thereby enhancing the rigidity of the steering column.

Further, since the slide portion and the stationary side are brought into slidable contact with each other by convex-concave fitting substantially in a triangular form, it is possible to satisfactorily prevent the backlash of the steering column against the load from the steering wheel wherever the slide portion may slide with respect to the stationary side (or whatever the tilt angle may be).

DESCRIPTION OF THE PREFERRED EMBODIMENTS

Description will be made below on an electric tilt adjustable and telescopically adjustable steering apparatus for a vehicle according to an embodiment of the present invention with reference to the drawings.

Figure 1:
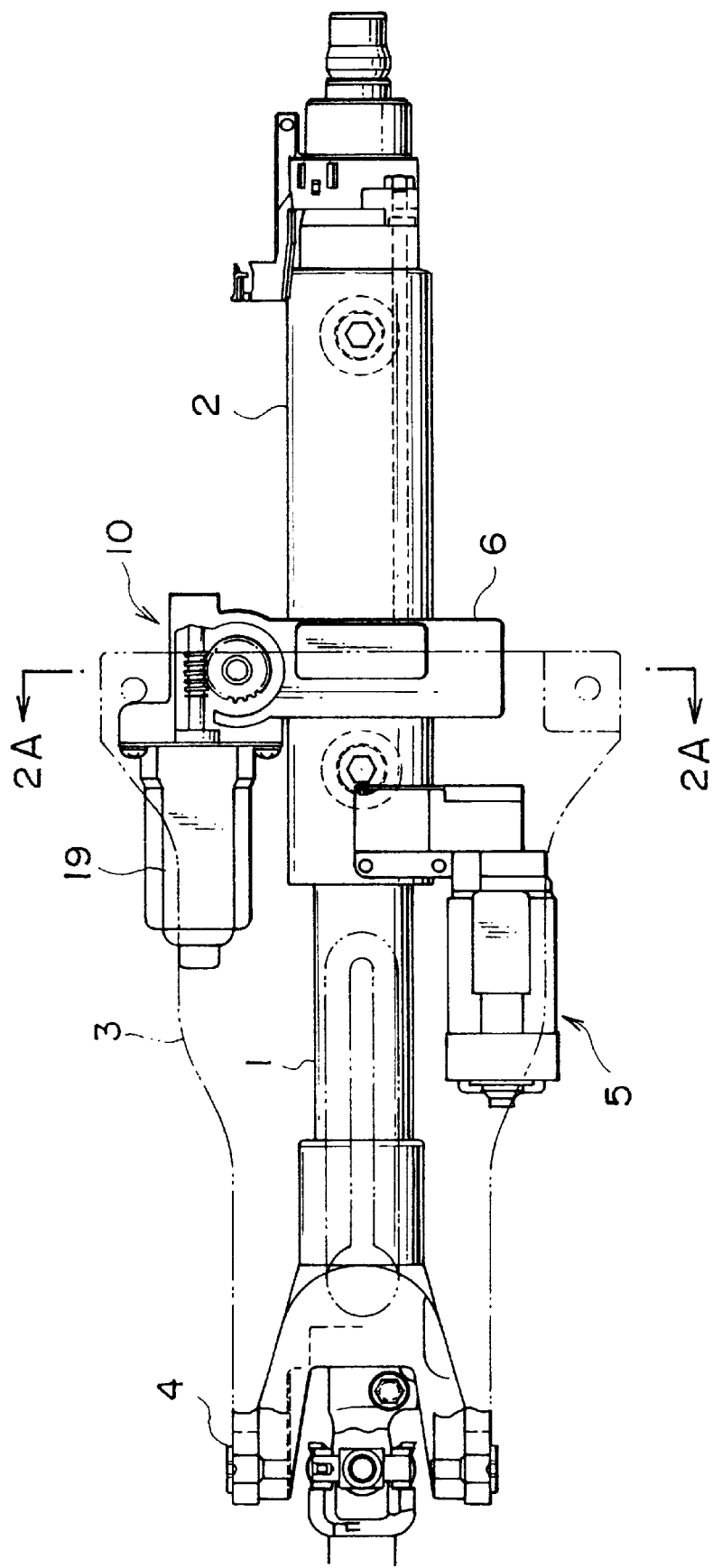
FIG. 1 is a side view of an electric tilt-adjustable and telescopically adjustable steering apparatus for a vehicle according to an embodiment of the present invention.
Figure 2A:
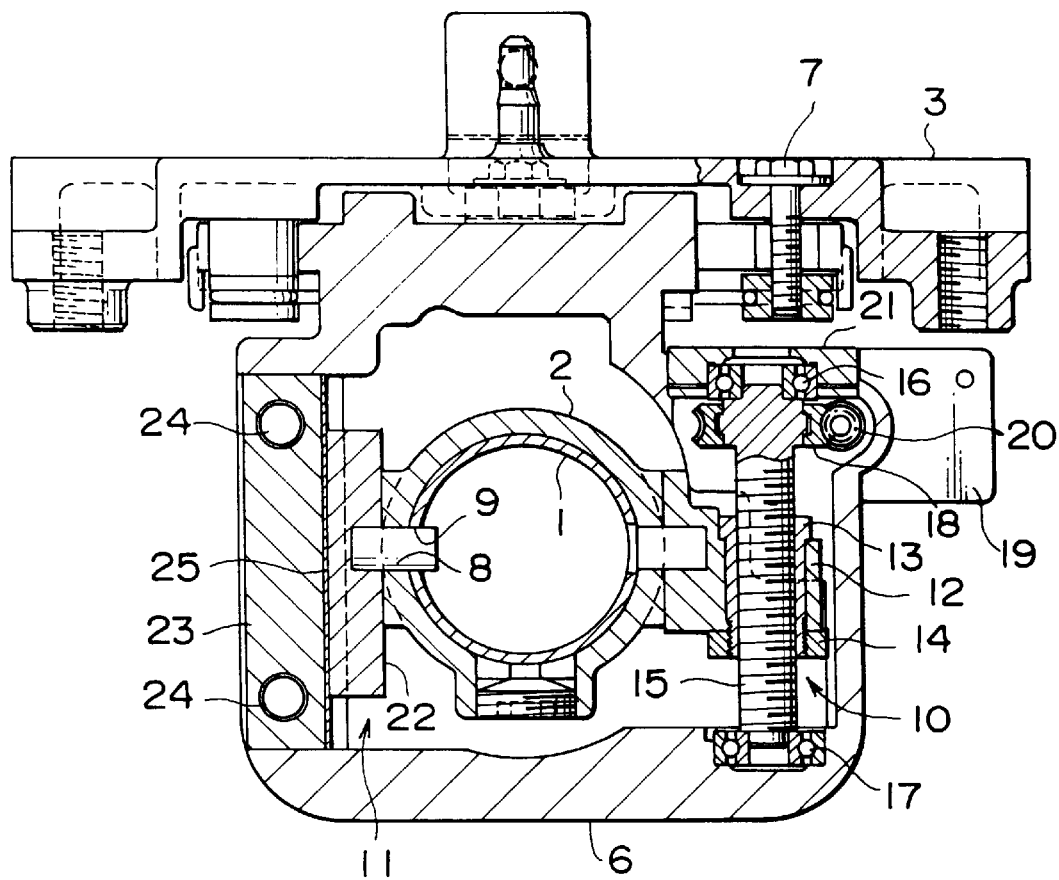
FIG. 2A is a lateral cross-sectional view of the steering apparatus along the line 2A—2A of FIG. 1.
Figure 2B:
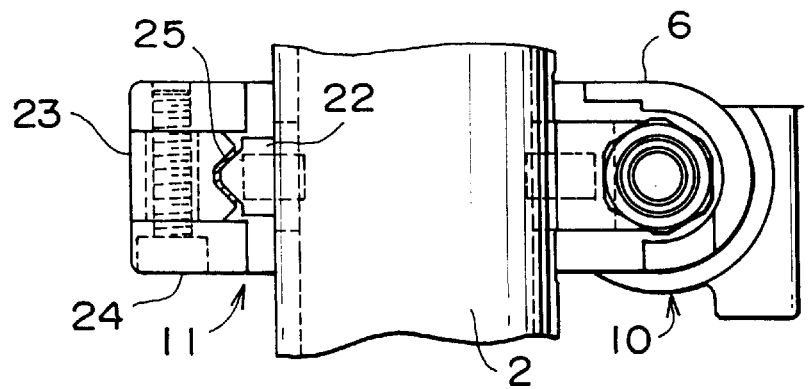
FIG. 2B is a plan view of the portion shown in FIG. 2A.
Figure 3A:
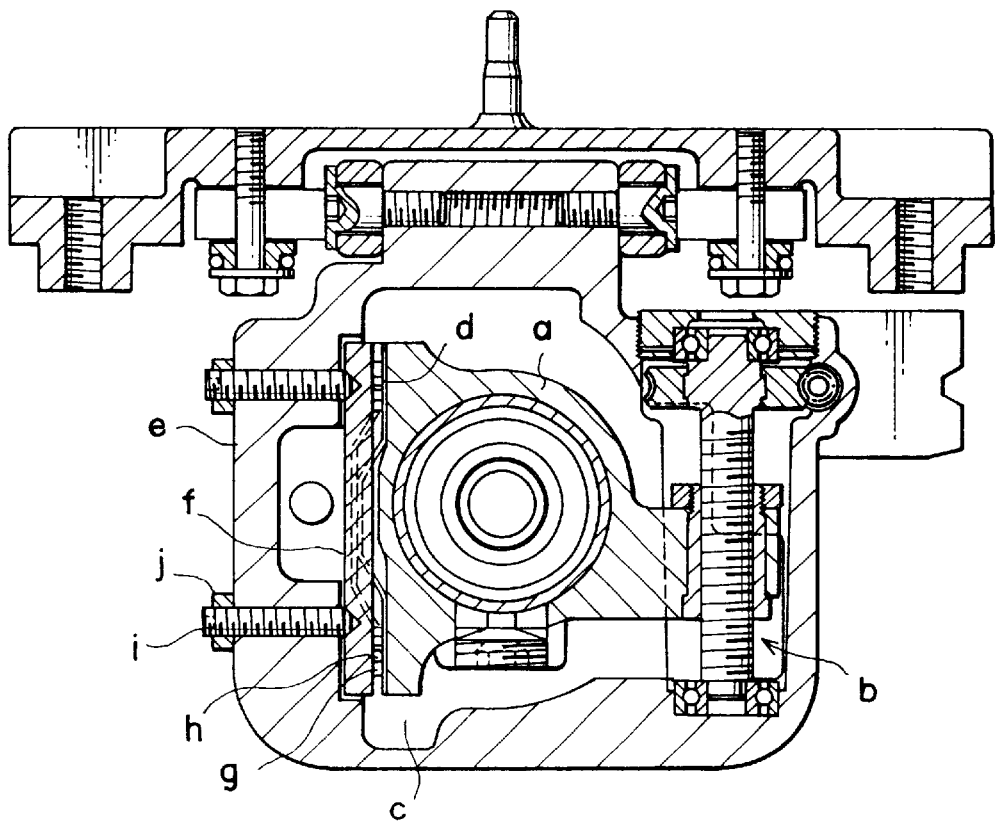
FIG. 3A is a lateral cross-sectional view of an electric tilt adjustable steering apparatus for a vehicle according to the Japanese Patent Application No. 2000-193227 (corresponding to the lateral cross-sectional view along the line 2A—2A of FIG. 1)
Figure 3B:
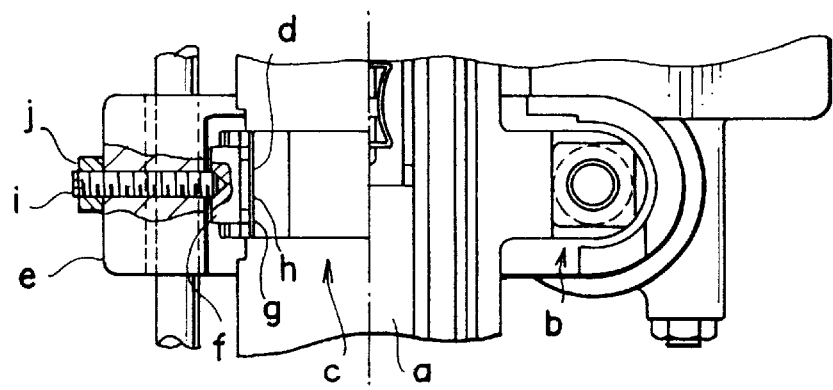
FIG. 3B is a plan view of the steering apparatus shown in FIG. 3A.

FIG. 1 is a side view of the electric tilt-adjustable and telescopically adjustable steering apparatus for a vehicle according to the embodiment of the present invention. FIG. 2A is a lateral cross sectional view along the line 2A—2A of FIG. 1 and FIG. 2B is a plan view of he portion shown in FIG. 2A.

As shown in FIG. 1, a steering column is composed of a lower column 1 on the front side of the vehicle and an upper column 2 on the rear side of the vehicle which is fitted to be slidable on the lower column 1. The lower end of the lower column 1 is rockably supported by a tilt center pin 4 which is disposed at an lower end of a bracket 3 on the car body side.

The upper column 2 is arranged to automatically cause telescopic slide in the axial direction with respect to the lower column 1 by an electric telescopic driving mechanism 5, so that the axial position of the steering wheel (not shown) can be adjusted desirably.

As shown in FIG. 2A, a box or housing 6 is provided in the environment of the upper column 2, and the box or housing 6 is secured to the body-side bracket 3 through bolts 7. The upper column 2 is arranged to be automatically tilt-adjusted inside this housing 6.

In the left part of FIG. 2A, the upper column 2 is rotatably engaged with the circumference of a pin 8 which is secured to a slide member 22 (to be described later). This pin 8 serves also as a stopper pin for a telescopic adjustment, and an axially elongated groove 9 is formed on the lower column 1. The pin 8 is engaged with this elongated groove 9, so as to serve as the stopper for adjusting the telescopic position and as a rotation preventing member.

Inside the housing 6, a tilt adjusting mechanism 10 is provided in the right part thereof and a slide portion 11 is disposed in the left part.

As a structure for the tilt adjusting mechanism 10, there is provided a cylindrical portion 12 on the right side of the upper column 2. Inside this cylindrical portion 12, an adjusting nut 13 is fitted, and is secured by a lock nut 14.

It is arranged such that a screw shaft 15 is engaged with the adjusting nut 13. The thread of this adjusting nut 13 and that of the screw shaft 15 are trapezoidal threads. The upper end and the lower end of the screw shaft 15 are rotatably supported to the housing 6 through the bearings 16 and 17, respectively.

An upper part of the screw shaft 15 is integrally formed with a worm wheel 18, and a worm 20 which is connected to the driving shaft of the electric motor 19 is meshed with this worm wheel 18. With this arrangement, when the electric motor 19 is driven, the rotational driving force is transmitted to the screw shaft 15 through the worm 20 and the worm wheel 18, thereby rotating the screw shaft 15. As a result, the adjusting nut 13 which is engaged with the screw shaft 15 is moved in the vertical direction together with the cylindrical portion 12 of the upper column 2, whereby the upper column 2 is automatically tilted.

Incidentally, the bearing 16 for the screw shaft 15 is fixed by a fastening bolt 21 on which release preventing agent is applied. By fastening the bolt 21 up to a predetermined torque, it becomes possible to preload the bearings 16 and 17 so as to securely support the screw shaft 15 at the upper end and the lower end in the lateral direction.

On the other hand, as an arrangement for the slide portion 11, a slide member 22 is provided on the left side of the upper column 2 and, as shown in FIG. 2B, the left end of this slide member 22 is formed in a substantially triangular convex shape.

On the left side of the housing 6, a pressure pad 23 is fastened by a bolt 24 and, as shown in FIG. 2B, the right end of this pressure pad 23 is also formed in a substantially triangular concave shape.

The concave surface of the triangular shape of this pressure pad 23 is provided with a spacer 25 formed of synthetic resin, thereby satisfactorily maintaining the sliding performance of the slide member 22. It should be noted that, instead of providing the spacer 25 of synthetic resin, coating for satisfactorily maintaining the sliding performance may be applied on the slide member 22 or the pressure pad 23.

Since the convex surface of the substantially triangular form of the slide member 22 and the concave surface of the substantially triangular form of pressure pad 23 are brought into fitting and slidable contact with each other via the spacer 25 which is formed of synthetic resin as described above, it is possible to smoothly slide the upper column 2 in the vertical direction upon tilt adjusting by sliding the convex surface of the substantially triangular form of the slide member 22 on the concave surface of the substantially triangular form of pressure pad 23.

It should be noted that, when the pressure pad 23 is attached to the housing 6 by means of the bolt 24, a preload is applied in the right direction from the side of the pressure pad 23 to the side of the upper column 2. With this application of the preload in the right direction, the upper column 2, the adjusting nut 13, and the like, are pressed in the right direction all the time, whereby a female screw of the adjusting nut 13 and a male screw of the screw shaft 15, or the like, can be firmly meshed with each other without backlash. Thus, it is possible to prevent backlash of the steering wheel (not shown) in the vertical direction and the horizontal direction.

In order to perform a tilt adjusting operation in the electric tilt adjustable steering apparatus having the above structure, when the driver operates a tilt position adjusting switch (not shown), the electric motor 19 is driven and the rotational driving force of the motor is transmitted to the screw shaft 15 through the worm 20 and the worm wheel 18, thereby rotating the screw shaft 15. As a result, the adjusting nut 13 which is engaged with the screw shaft 15 is moved in the vertical direction together with the cylindrical portion 12 of the steering column 1, and the upper column 2 is automatically tilted, whereby the angle of inclination of the steering column can be adjusted desirably.

At the time of this tilting, the convex surface of the substantially triangular form of the slide member 22 on the side of the upper column 2 slides on the concave surface of the substantially triangular form of the pressure pad 23, so that it is possible to slide the upper column 2 smoothly in the vertical direction.

Moreover, since the convex surface of the substantially triangular form of the slide member 22 and the concave surface of the substantial triangular form of the pressure pad 23 are fitted to each other through the spacer 25 formed of synthetic resin, it is possible to satisfactorily prevent backlash of the upper column 2 in the vertical and horizontal directions even when a load is applied on the steering wheel (not shown) in the vertical and horizontal directions, thereby enhancing the rigidity of the steering column.

Furthermore, since the slide member 22 and the pressure pad 23 are brought into slidable contact by the convex-concave fitting in the substantially triangular form, it is possible to satisfactorily prevent the backlash of the upper column 2 to cope with the load from the steering wheel (not shown) on whatever position the slide member 22 may slide with respect to the pressure pad 23 (or whatever angle the tilting angle may take).

It should be noted that the present invention is not limited to the embodiment described above, but may allow various modifications.

As described above, according to the present invention, the slide portion is in slidable contact with the stationary side by the convex-concave fitting in the substantially triangular form, so that it is possible to slide the steering column in the vertical direction smoothly by sliding the slide portion on this substantially triangular convex-concave fitting portion at the time of tilt adjusting.

Moreover, since the slide portion is in slidable contact with the stationary side by the convex-concave fitting in the substantially triangular form, it is possible to satisfactorily prevent the backlash of the steering column in the vertical and horizontal directions even when a load is given to the steering wheel in the vertical and horizontal directions, thereby enhancing the rigidity of the steering wheel.

Furthermore, since the slide member 22 is in slidable contact with the stationary side by the convex-concave fitting in the substantially triangular form, it is possible to satisfactorily prevent the backlash of the steering column so as to cope with the load from the steering wheel on whatever position the slide member 22 may slide with respect to the stationary side (or whatever angle the tilting angle may take).

What is claimed is:

1. An electric tilt adjustable steering apparatus for a vehicle for tilt adjusting a steering column by means of an electric motor so as to regulate an angle of inclination of the steering column to a desired one, comprising:

a tilt adjusting mechanism provided on one side of said steering column for converting a rotational driving force of said electric motor into a rectilinear motion so as to tilt-adjust the steering column; and a slide portion provided on another side of said steering column to be brought into slidable contact with a stationary member by convex-concave fitting in a substantially triangular form, so as to slide upon tilt adjusting of the steering column.

* * * * *